United States Patent
Muller

[11] Patent Number: 5,153,588
[45] Date of Patent: Oct. 6, 1992

[54] WARNING SYSTEM HAVING LOW INTENSITY WIND SHEAR ENHANCEMENTS

[75] Inventor: Hans R. Muller, Redmond, Wash.

[73] Assignee: Sundstrand Corporation, Rockford, Ill.

[21] Appl. No.: 598,140

[22] Filed: Oct. 16, 1990

Related U.S. Application Data

[63] Continuation-in-part of Ser. No. 770,423, Aug. 29, 1985.

[51] Int. Cl.$^5$ ............................................. G08B 23/00
[52] U.S. Cl. ................................... 340/968; 340/970; 340/967
[58] Field of Search .............. 340/963, 967, 974, 976, 340/970, 968; 73/178 T; 364/433

[56] References Cited

U.S. PATENT DOCUMENTS

| 4,684,948 | 8/1987 | Bateman | 340/970 |
| 4,947,164 | 8/1990 | Bateman | 340/970 |

FOREIGN PATENT DOCUMENTS

| 8601022 | 2/1986 | World Int. Prop. O. | 340/970 |
| 8701356 | 3/1987 | World Int. Prop. O. | 340/968 |
| 8906846 | 7/1989 | World Int. Prop. O. | 340/970 |

Primary Examiner—Jin F. Ng
Assistant Examiner—Brent A. Swarthout
Attorney, Agent, or Firm—Mason, Kolehmainen, Rathburn & Wyss

[57] ABSTRACT

A ground proximity warning system for aircraft having flight path angle based warning criteria generates a warning in the event of an excessively steep flight path angle during an approach to a landing. The warning criteria are altered to provide an earlier warning upon the occurrence of a low intensity wind shear or a below glideslope condition. A below glideslope warning system that is biased as a function of decreasing performance shear is also provided. A descent rate based warning system usable above a predetermined altitude may also be provided to supplement the flight path angle warning system.

10 Claims, 2 Drawing Sheets

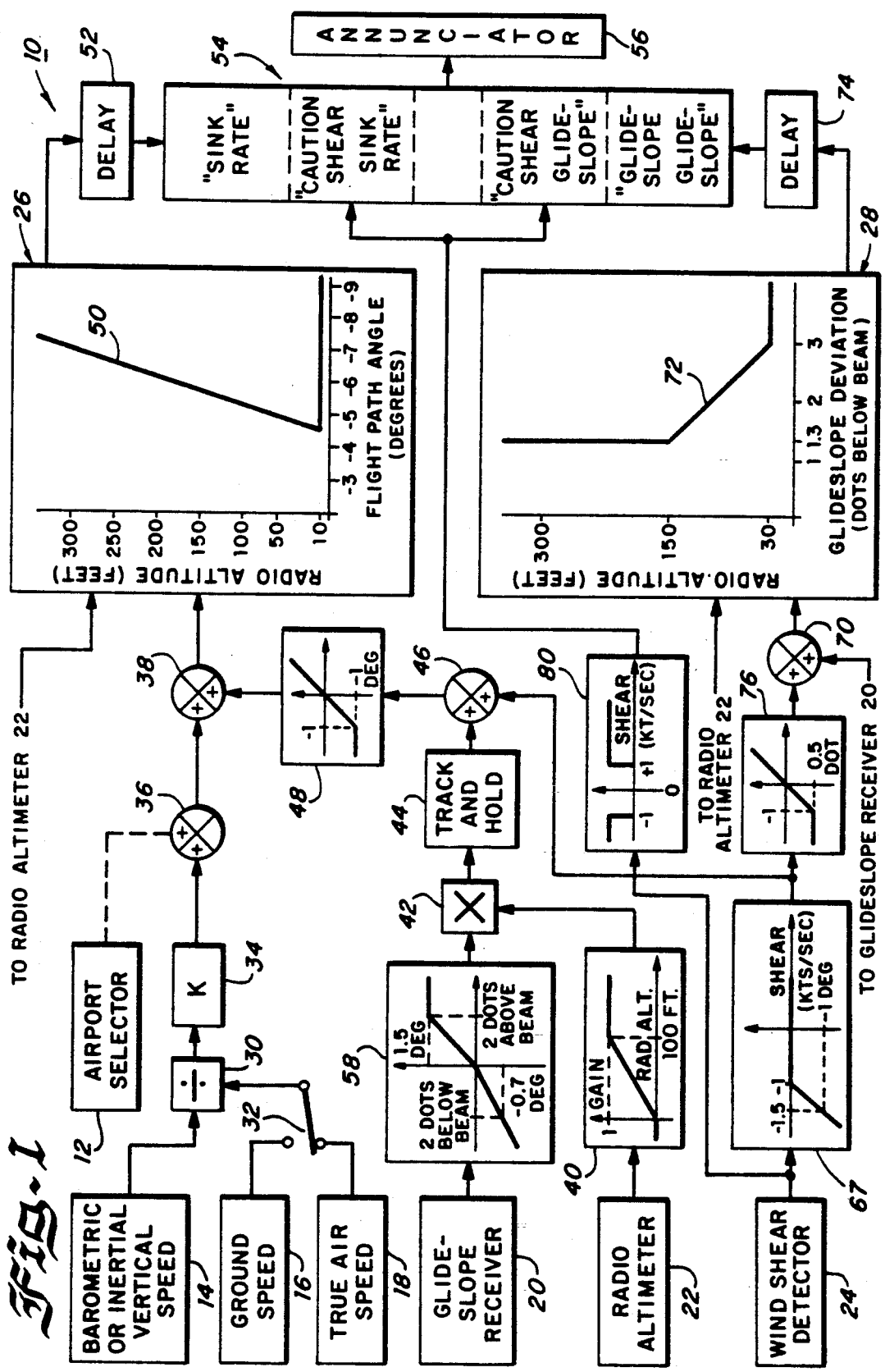

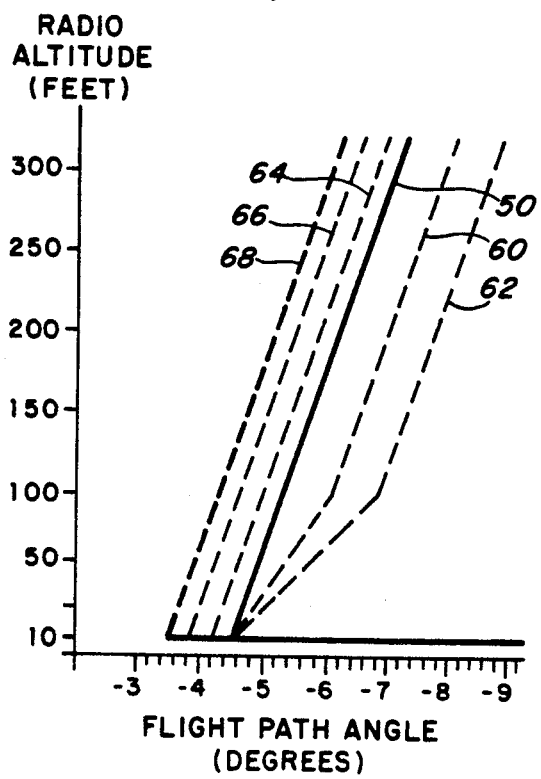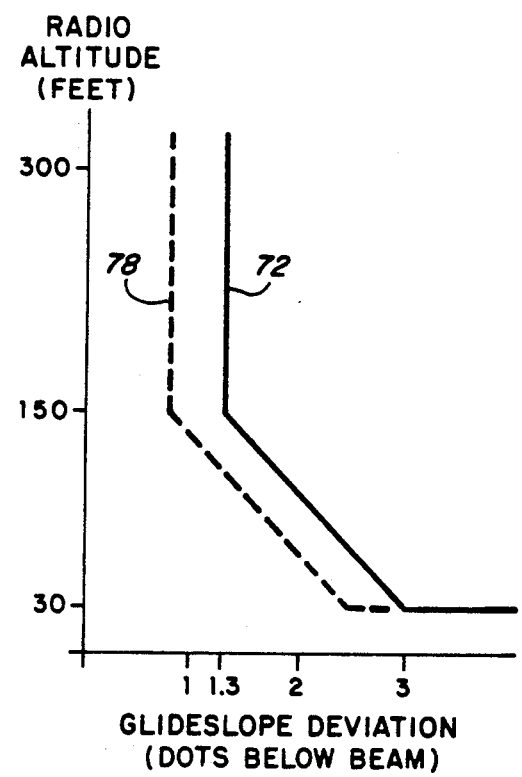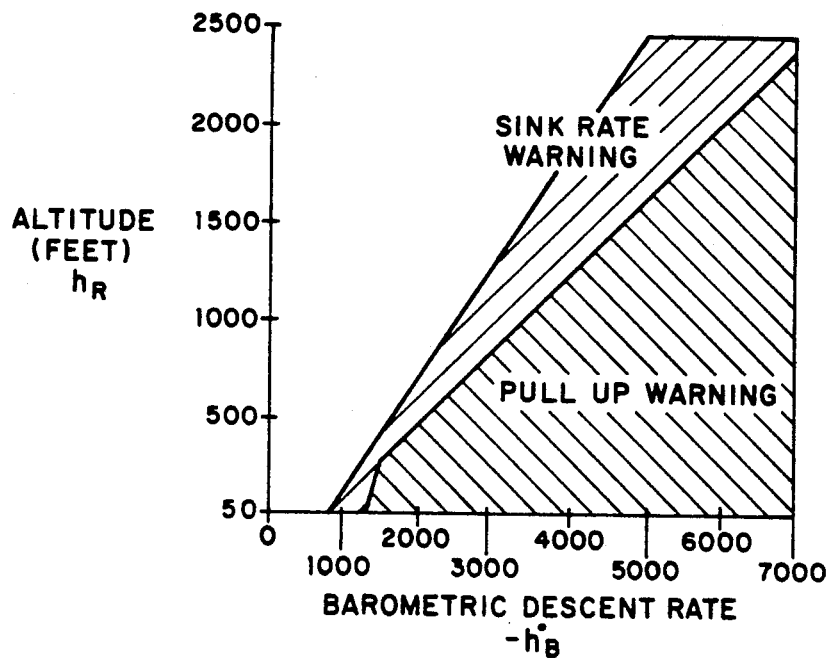

WARNING SYSTEM HAVING LOW INTENSITY WIND SHEAR ENHANCEMENTS

CROSS REFERENCE TO RELATED APPLICATIONS

This application is a continuation-in-part of copending U.S. application Ser. No. 06/770,423 filed on Aug. 29, 1985, hereby incorporated by reference.

BACKGROUND OF THE INVENTION

1. Field of the Invention

This invention relates generally to ground proximity warning systems of the type that monitor various flight parameters and generate a warning upon the occurrence of a hazardous flight condition, as well as to wind shear warning systems that detect the presence of a wind shear condition and generate a warning when a hazardous wind shear condition is detected. More particularly, the present invention relates to a warning system particularly usable during an approach to a landing phase of flight. The system determines the flight path angle of the aircraft during an approach and generates a warning in the event that the flight path angle (negative) is excessive for the altitude at which the aircraft is flying. The warning criteria are modified by a glideslope deviation signal from an ILS receiver and by a wind shear signal from a wind shear detector so that a less steep angle is required for a warning to be generated if the aircraft is below the glideslope or if wind shears are present. In addition, the glideslope warning criteria are altered during the presence of a wind shear so that a smaller deviation below the glideslope is required to generate a warning.

2. Description of the Prior Art

Various prior art warning systems are known. For example, U.S. Pat. Nos. 3,946,358; 3,947,808; 3,947,809; 4,060,793 and 4,215,334 disclose warning systems that generate warnings during an approach phase of flight when the descent rate of the aircraft is excessive for the altitude at which the aircraft is flying. U.S. Pat. No. 3,925,751 disclose systems that monitor the deviation of the aircraft below the glideslope beam and generate a warning if the glideslope deviation is excessive. U.S. Pat. Nos. 4,725,811 and 4,891,642 disclose wind shear warning systems that detect the occurrence of a wind shear condition and generate a warning upon the occurrence of a decreasing performance wind shear that exceeds a predetermined level. All of the above patents are incorporated herein by reference.

While these warning systems provide a warning upon the occurrence of an excessive deviation from normal operational conditions of the parameter they are monitoring, it is possible that a combination of conditions that are not individually sufficient to generate a warning in the prior art systems could be potentially hazardous. For example, a low intensity wind shear of a magnitude that would not be dangerous per se and hence would not normally cause a warning to be generated, could be hazardous if combined with other potentially hazardous conditions. For example, a low intensity wind shear could prove hazardous when combined with an excessively steep descent angle or with a below the glideslope condition, or with a combination thereof.

It has also been found that while systems that warn of an excessive descent rate during an approach to a landing are effective, the vertical speed varies during an approach along a 3° glideslope for different approach speeds and wind conditions. By measuring actual flight path angle, many of these variations may be reduced, particularly at altitudes below 300 feet above the ground.

SUMMARY

Accordingly, it is an object of the present invention to provide an enhanced warning system that overcomes many of the disadvantages of the prior art warning systems.

It is another object of the present invention to provide warnings of hazardous conditions that may not be detected by prior art warning systems.

It is another object of the present invention to provide a flight path angle based warning system.

It is yet another object of the present invention to provide a below glideslope warning system that is biased as a function of low intensity wind shears.

It is yet another object of the present invention to provide a flight path angle based warning system that is biased as a function of low intensity wind shears.

It is yet another object of the present invention to provide a flight path angle based warning system that is biased as a function of below glideslope deviation.

Thus, in accordance with a preferred embodiment of the invention, a flight path angle based warning system is provided, particularly at altitudes below 300 feet. The flight path angle based system determines the flight path angle, for example, from ground speed or true airspeed and barometric or inertial vertical speed. The flight path angle thus selected is compared with the altitude at which the aircraft is flying, and if the flight path angle is excessively steep for the altitude at which the aircraft is flying, a warning is generated. The flight path angle can be biased by either a below glideslope signal or a wind shear signal to provide earlier warnings in the presence of a below glideslope condition or a low intensity wind shear condition or both. The system also utilizes a below glideslope alert that is biased as a function of wind shear to provide earlier below glideslope warnings in the event of low level decreasing performance wind shears.

BRIEF DESCRIPTION OF THE DRAWING

These and other objects and advantages of the present invention will become readily apparent upon consideration of the following detailed description and attached drawing, wherein:

FIG. 1 is a block diagram illustrating the flight path angle based warning system according to the invention;

FIG. 2 illustrates the flight path angle based warning envelope of the system of FIG. 1 biased as a function of glideslope deviation and wind shear;

FIG. 3 is a graph showing the glideslope alert warning system of FIG. 1 biased as a function of wind shear; and FIG. 4 illustrates a descent rate based warning envelope utilized by the system at higher altitudes.

DETAILED DESCRIPTION OF THE PREFERRED EMBODIMENT

Referring now to the drawing, with particular attention to FIG. 1, there is shown an improved warning system generally designated by the reference numeral 10. The system 10 receives signals from various instruments and discretes, such as an airport selector 12, a barometric or inertial vertical speed source 14, such as a barometric rate circuit or an inertial guidance system, a ground speed signal source 16, such as a Doppler radar based ground speed sensor or a true airspeed signal source 18, a glideslope receiver 20, a radio altimeter 22 and a wind shear detector 24 which may be a wind shear detector of the type disclosed in U.S. Pat. Nos. 4,725,811 and 4,891,642, incorporated herein by reference. The signals discussed above may be obtained from individual instruments as illustrated in FIG. 1 or from a data bus, particularly in newer aircraft. The airport selector 12 contains data peculiar to particular airports such as glideslope beam angles that are different than the standard 3° glideslope angle, and applies a bias signal to the summing junction 36 to compensate for such variations, for example, to avoid nuisance warnings.

The system according to the invention generates two alerts defined by a pair of envelope defining circuits 26 and 28, with the envelope 26 defining a flight path angle based warning system and the envelope 28 defining a glideslope deviation warning system. The warning envelope 26 is biased both as a function of glideslope deviation and wind shear, and the glideslope deviation envelope 28 is biased as a function of wind shear.

The system according to the invention utilizes a divider 30 that receives the vertical speed signal from the source 14 and divides it by either the ground speed signal from the source 16 or by the true airspeed signal from the true airspeed signal source 18. Preferably, the ground speed signal source 16 is utilized, but the true airspeed signal may be used if a ground speed signal is unavailable. A switch 32 is used to select either the ground speed or the true airspeed, and may be operated either automatically or manually. The output of the divider 30 is a signal representative of the flight path angle in radians, and is applied to a scaling amplifier 34 which converts the flight path angle to degrees. The flight path angle is then applied to the envelope circuit 26 via a pair of summing junctions 36 and 38.

The envelope circuit 26 receives the signal from the summing junction 38 and generates a warning signal if the flight path angle is negative at a steeper slope than is safe for the altitude at which the aircraft is flying, as determined by the altitude signal received from the radio altimeter 22. Specifically, with the basic alert envelope, a warning is given for combinations of altitude and flight path angle that are to the right of a line 50. The warning signal from the envelope generator 26 is applied to a delay circuit 52 and thence to a voice generating and priority circuit 54 which generates an appropriate one of several audible warnings and applies it to an annunciator 56 such as a speaker, headphones or cockpit communications system.

A glideslope deviation signal from the glideslope receiver 20 is also applied to the summing junction 38 via a function generator 58, a multiplier 42, a track and hold circuit 44, a summing junction 46 and a limiter 48. The aforesaid components serve to bias the flight path angle envelope 26 to make it more sensitive when the aircraft is below the glideslope and less sensitive when it is above the glideslope. A signal from the radio altimeter 20 is applied to the multiplier 22 via a function generator 40. The signal from the function generator 40 serves to reduce the glideslope deviation bias of the flight path angle signal for altitudes below 100 feet. Above 100 feet of radio altitude the envelope is biased by 1.5° when the aircraft is 2 dots above the glideslope beam and −0.7° when the aircraft is 2 dots below the glideslope beam, as is illustrated by the function generator 58. The effects of the bias are illustrated in FIG. 2, where the lines 60 and 62 show the warning boundaries when the envelope has been biased for deviations of 1 and 2 dots, respectively, above the glideslope beam. Lines 64 and 66 illustrate the warning envelope when the envelope has been biased for 1 and 2 dots below the glideslope beam, respectively. Below 100 feet of radio altitude, the bias is gradually reduced to zero as the signal from the function generator 40 applied to the multiplier 42 is gradually reduced to zero at zero feet of altitude. Since some glideslope beams are not usable below 100 feet, the track and hold circuit 44 is provided to track the glideslope deviation signal as long as the aircraft is above 100 feet of radio altitude. Below 100 feet, the average deviation that was previously measured at altitudes between 130 feet and 100 feet is determined and held by the track and hold circuit 44.

In addition to biasing the warning envelope 26 as a function of glideslope deviation, the envelope 26 is also biased as a function of wind shear. This is accomplished by applying a wind shear signal from the wind shear detector 24 to the summing junction 38 via a function generator 67, the summing junction 46 and the limiter 48. The function generator 67 applies a biasing signal to the summing junction 46 in the presence of decreasing performance shears in excess of 1 knot per second. In the illustrated embodiment, a −1° bias is generated for decreasing performance shears of 1.5 knots per second and greater. Thus, the warning envelope is biased a maximum of 1° negative as is illustrated by the line 68 (FIG. 2) for decreasing performance shears of 1.5 knots per second and greater, however, other values of bias could be used and the bias could be made a function of altitude with greater biases being utilized at higher altitudes.

The system according to the invention also employs a glideslope deviation warning that is defined by the glideslope warning envelope circuit 28 that receives a glideslope deviation signal from the glideslope deviation receiver 20 via a summing junction 70. The glideslope warning generator 28 also receives a signal from the radio altimeter 22 and generates a below glideslope alert if the below glideslope deviation is excessive for the altitude at which the aircraft is flying. Specifically, the alert is generated if the envelope above and to the right of a line 72 is penetrated. When such penetration occurs, the alert signal is applied to a delay circuit 74 and then to the voice generator 54 and annunciator 56 to generate the appropriate warning.

It has been found that low intensity wind shears having intensities of less than −1 knot per second that are insufficient to cause a normal wind shear warning in a wind shear detection system, can still pose a problem when the aircraft is below the glideslope. Consequently, the wind shear signal from the wind shear detector 24 is applied to the summing junction 70 via the function generator 67 and a function generator 76 in order to bias the warning envelope defined by the line 72 for negative wind shears. Specifically, the envelope is biased by 0.5 dots for each degree of negative bias received from the function generator 66 and limited to a maximum bias of 0.5 dots. The maximum bias of the envelope defined by the line 72 is illustrated by a line 78 (FIG. 3). Thus, an earlier below glideslope alert is provided upon the occurrence of a decreasing performance wind shear.

When a warning or advisory is given, it is desirable to provide the pilot with information defining the specific type of hazardous flight condition encountered. Thus, the voice generator 54 is programmed with different messages and the appropriate message is selected depending on the type of hazardous condition encountered. Thus, in addition to receiving the flight path angle based warning from the delay 52 and the below glideslope advisory from the delay 74, a low intensity shear discrete is also applied to the voice generator 54. The low intensity shear discrete is provided by a window comparator 80 that responds to both increasing and decreasing performance wind shear signals received from the wind shear detector 24 and provides an output to the voice generator 54 whenever the wind shear signal from the wind shear detector 24 exceeds ±1 knot per second. The low intensity shear discrete from the window comparator 80 is used in conjunction with the signals from the delay circuits 52 and 74 to select the specific warning to be given. For example, if a flight path angle based warning is received from the delay generator 52 in the absence of a low intensity shear discrete from the window comparator 80, a message such as "SINK RATE" may be generated. If low intensity wind shear were also present, the message could be changed to read "CAUTION SHEAR, SINK RATE". Similarly, if a below glideslope alert were received from the delay circuit 74 in the absence of a wind shear discrete, the message could be "GLIDESLOPE, GLIDESLOPE". In the presence of the low intensity shear discrete, the message could be changed to "CAUTION SHEAR, GLIDESLOPE". Thus, the specifics of the situation encountered can be communicated to the pilot using the messages described or similar messages.

As previously stated, the flight path angle based envelope 26 is particularly effective for altitudes below 300 feet above the ground. For higher altitudes, the envelope may be extended by extending the line 50 to higher altitudes or, alternatively, the warning may be switched to a barometric descent rate warning based envelope, such as the envelope shown in FIG. 4 above a predetermined altitude, such as, for example, 300 feet. The warning envelope illustrated in FIG. 4 is one of the envelopes utilized by the system disclosed in U.S. Pat. No. 4,215,334. The envelope illustrated in FIG. 4 compares the barometric descent rate (or an inertially derived descent rate) with the altitude above ground, and generates a warning if the descent rate is excessive for the altitude at which the aircraft is flying. If the descent rate is only moderately excessive, the warning "SINK RATE" will be given while the warning "PULL UP" will be given for greater descent rates. The switching can be accomplished by conventional switching devices that monitor radio altitude and switch between the flight path angle based envelope 26 (FIG. 1) and the barometric descent rate based envelope of FIG. 4 at the predetermined altitude above ground. Alternatively, in some systems, it may be desirable to utilize the envelopes of FIG. 1 and FIG. 4 concurrently.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the U.S. is:

1. A ground proximity warning system for warning the pilot of an aircraft of a dangerous flight condition during an approach to a landing, comprising:
   means for providing a signal representative of the flight path angle of the aircraft;
   means for providing a signal representative of the altitude above ground of the aircraft;
   means responsive to said flight path angle and altitude above ground representative signals for generating the warning according to a predetermined set of criteria if the flight path angle is too steep for the altitude above ground at which the aircraft is flying;
   first means for detecting a wind shear condition;
   second means responsive to said first detecting means for detecting a decreasing performance wind shear condition; and
   means responsive to the first and second detecting means for altering said predetermined set of criteria to cause said warning to be generated at less steep flight path angles in the presence of decreasing performance wind shear.

2. A ground proximity warning system as recited in claim 1, wherein said altering means is responsive to a decreasing performance wind shear for altering said predetermined set of criteria.

3. A ground proximity warning system as recited in claim 1 further including:
   means for receiving a glideslope signal and providing a glideslope deviation signal representative of the deviation of the aircraft from the glideslope; and
   means responsive to the glideslope deviation signal for altering said predetermined set of criteria to cause said warning to be generated at less steep flight path angles in the presence of a below the glideslope condition.

4. A ground proximity warning system as recited in claim 1 further including:
   means for receiving a signal representative of the vertical velocity of the aircraft;
   means for receiving a signal representative of the horizontal velocity of the aircraft;
   means for receiving a signal representative of the altitude above ground of the aircraft; and
   means responsive to said vertical and horizontal velocity representative signals for generating said signal representative of the flight path angle of the aircraft.

5. A ground proximity warning system for warning the pilot of an aircraft of a dangerous flight condition during an approach to a landing, comprising:
   means for providing a signal representative of the flight path angle of the aircraft;
   means for providing a signal representative of the altitude above ground of the aircraft;
   means responsive to said flight path angle and altitude above ground representative signals for generating a warning according to a predetermined set of criteria if the flight path angle is too steep for the altitude above ground at which the aircraft is flying;
   means for receiving a glide slope signal and providing a glide slope deviation signal representative of the deviation of the aircraft from the glide slope; and
   means responsive to the glide slope deviation signal for altering said predetermined set of criteria to cause said warning to be generated at less steep flight path angles in the presence of a below the glide slope condition.

6. A ground proximity warning system as recited in claim 5 further including:
    means for receiving a signal representative of the vertical velocity of the aircraft;
    means for receiving a signal representative of the horizontal velocity of the aircraft;
    means for receiving a signal representative of the altitude above ground of the aircraft; and
    means responsive to said vertical and horizontal velocity representative signals for generating said signal representative of the flight path angle of the aircraft.

7. A ground proximity warning system for warning the pilot of an aircraft of a dangerous flight condition during an approach to a landing, comprising:
    means for receiving a signal representative of the vertical velocity of the aircraft;
    means for receiving a signal representative of the horizontal velocity of the aircraft;
    means for receiving a signal representative of the altitude above ground of the aircraft;
    means responsive to said vertical and horizontal velocity representative signals for generating a signal representative of the flight path angle of the aircraft;
    means operative above a predetermined altitude and responsive to said vertical velocity and altitude above ground representative signals for generating a warning according to a predetermined set of criteria if the vertical velocity is excessive in a negative direction for the altitude at which the aircraft is flying; and
    means operative below said predetermined altitude and responsive to said flight path angle representative signal and said altitude above ground signal for generating a warning according to a second predetermined set of criteria if the flight path angle is too steep for the altitude at which the aircraft is flying.

8. A ground proximity warning system as recited in claim 7 further including:
    means for receiving a glideslope signal and providing a glideslope deviation signal representative of the deviation of the aircraft from the glideslope; and
    means responsive to the glideslope deviation signal for altering said second predetermined set of criteria to cause said warning to be generated at less steep flight path angles in the presence of a below the glideslope condition.

9. A ground proximity warning system as recited in claim 7 further including:
    first means for providing a wind shear signal representative of wind shear;
    second means responsive to said first detecting means for detecting a decreasing performance wind shear condition; and
    means responsive to the wind shear signal for altering said second predetermined set of criteria to cause said warning to be generated at less steep flight path angles in the presence of a wind shear condition.

10. A ground proximity warning system as recited in claim 9, wherein said wind shear responsive means is responsive to a decreasing performance wind shear for altering said second predetermined set of criteria.

* * * * *